United States Patent
Gleichauf et al.

(10) Patent No.: US 6,415,321 B1
(45) Date of Patent: Jul. 2, 2002

(54) DOMAIN MAPPING METHOD AND SYSTEM

(75) Inventors: Robert E. Gleichauf, San Antonio; Gerald S Lathem, Elgin; Scott V. Waddell, Austin, all of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/223,072

(22) Filed: Dec. 29, 1998

(51) Int. Cl.⁷ .............................................. G06F 13/00

(52) U.S. Cl. .................................................... 709/224

(58) Field of Search ............................... 709/200, 220, 709/223, 224, 225, 226

(56) References Cited

U.S. PATENT DOCUMENTS

| | | | |
|---|---|---|---|
| 5,032,979 A | 7/1991 | Hecht et al. | 364/200 |
| 5,101,402 A | 3/1992 | Chiu et al. | 370/17 |
| 5,278,901 A | 1/1994 | Shieh et al. | 380/4 |
| 5,414,833 A | 5/1995 | Hershey et al. | 395/575 |
| 5,448,724 A | 9/1995 | Hayashi | 395/182.02 |
| 5,488,715 A | 1/1996 | Wainwright | 395/182.02 |
| 5,524,238 A | 6/1996 | Miller et al. | 395/600 |
| 5,557,742 A | 9/1996 | Smaha et al. | 395/186 |
| 5,606,668 A | 2/1997 | Shwed | 395/200.11 |
| 5,621,889 A | 4/1997 | Lemuzeaux et al. | 395/186 |
| 5,699,513 A | 12/1997 | Feigen et al. | 395/187.01 |
| 5,793,763 A | 8/1998 | Mayes et al. | 370/389 |
| 5,796,942 A | 8/1998 | Esbensen | 395/187.01 |
| 5,796,951 A * | 8/1998 | Hamner et al. | 709/223 |
| 5,798,706 A | 8/1998 | Kraemer et al. | 340/825.07 |
| 5,805,801 A | 9/1998 | Holloway et al. | 395/187.01 |
| 5,826,014 A | 10/1998 | Coley et al. | 395/187.01 |
| 5,919,257 A | 7/1999 | Trostle | 713/200 |
| 5,931,946 A | 8/1999 | Terada et al. | 713/201 |
| 5,991,881 A | 11/1999 | Conklin et al. | 713/201 |

OTHER PUBLICATIONS

Cheswick et al. "Firewalls and Internet Security Repelling the Wily Hacker" ISBN 0–201–63357–4 (pp. 143 to 156), 1994.*

"Introduction to Algorithms," by Thomas H. Cormen, Charles E. Leiserson, Ronald L. Rivest, Chap 34, pp. 853–885, Copyright © 1990.

"Preliminary Report on Advanced Security Audit Trail Analysis on UNIX," N. Habra et al., pp. 1–34 (found at http://www.cs.purdue.edu/coast/archive/data/categ24.html), Sep. 1994.

"Idiot–Users Guide," M. Crosbie, et al., pp. 1–63, (found at http://www.cs.purdue.edu/coast/archive/data/categ24.html), Sep. 1996.

(List continued on next page.)

Primary Examiner—Robert B. Harrell
(74) Attorney, Agent, or Firm—Baker Botts L.L.P.

(57) ABSTRACT

A method and system for mapping a network domain provides a centralized repository for network information to support network devices, including an intrusion detection system. A domain mapping device includes an acquisition engine for acquiring network information, hypercube storage for storing network information, and a query engine for responding to queries from network devices for network information. The acquisition engine acquires network information by active scanning of network devices, passive scanning of network devices, polling of network devices, or receiving network information pushed from network devices. The network information includes device type, operating system, service and vulnerability information. The query engine provides network information in response to queries from network devices, such as intrusion detection devices that use the data to detect attacks on the vulnerabilities of the network.

20 Claims, 3 Drawing Sheets

OTHER PUBLICATIONS

"An Introduction to Intrusion Detection," A. Sundaram, pp. 1–10, (found at http://www.cs.purdue.edu/coast/archive/data/categ24.html), No date.

"Use of A Taxonomy of Security Faults," T. Aslam, et al., pp. 1–10, (found at http://www.cs.purdue.edu/coast/archive/data/categ24.html), Sep. 1996.

"Artificial Intelligence and Instrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html), No date.

"GrIDS–A Graph Based Intrusion Detection System For Large Networks," S. Staniford–Chen, et al., 10 pages, (found at http://www.cs.purdue.edu/coast/archive/data/categ24.html), No date.

"A Pattern Matching Model For Misuse Intrusion Detection," S. Kumar, et al., pp. 1–11, (found at http://www.cs.purdue.edu/coast/archive/data/categ24.html), No date.

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html), No date.

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html), No date.

"A Standard Audit Trail Format", Matt Bishop, 10 pages, (found at http://www.cs.purdue.edu/coast/archive/data/categ24.html), No date.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html), No date.

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html), No date.

"Pseudo–Network Drivers and Virtual Networks", S.M. Bellovin, 15 pages, (found at http://www.cs.purdue.edu/coast/archive/data/categ30.html), No date.

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html), No date.

"The 'Session Tty' Manager", S.M. Bellovin, pp. 1–16., (found at http://www.cs.purdue.edu/coast/archive/data/categ30.html), No date.

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html), No date.

"TCP Wrapper Network Monitoring, Access Control, and Booby Traps", Wietse Venema, 8 pages., (found at http://www.cs.purdue.edu/coast/archive/data/categ30.html), No date.

"Characteristics of Wide–Area TCP/IP Conversations", R. Cáceres, et al., pp. 1–12, (found at http://www.cs.purdue.edu/coast/archive/data/categ30.html), No date.

"A Unix Network Protocol Security Study: Network Information Service", D.K. Hess, et al., 5 pages, (found at http://www.cs.purdue.edu/coast/archive/data/categ30.html), No date.

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference,* Oct. 1991, pp. 362–371., (found at http://seclab.sc.ucdavis.edu/papers.html.), 1991.

"Internetwork Security Monitor: An Intrusion–Detection System for Large–Scale Networks", L.T. Heberlein et al., *Proc. of the 15th National Computer Security Conference,* Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2, 1999*, pp. 1–47, (found at http://seclab.cs.ucdavis.edu/papers.html), Jan. 26, 1999.

"Luby–Rackoff Backwards: Increasing Security by Making Block Ciphers Non–Invertible", M. Bellare, et al., *Advances in in Cryptology–Eurocrypt 98 Proceedings, Lecture Notes in Computer Science,* vol. 1403 Springer–Verlat (1998) pp. 1–27, (found at http://seclab.cs.ucdavis.edu/papers.html), Oct. 17, 1998.

"Detecting Disruptive Routers: A Distributed Network Monitoring Approach", K.A. Bradley, et al., *Proceedings of the 1998 IEEE Symposium on Security and Privacy,* Oakland, CA, pp. 115–124 (found at http://seclab.cs.ucdavis.edu/papers.html), May 1998.

"Stack and Queue Integrity on Hostile Platforms", P.T. Devanbu, et al., *IEEE Symposium on Security and Privacy,* Oakland CA, (found at http://seclab.cs.ucdavis.edu/papers.html), 1998.

"Techniques for Trusted Software Engineering", P.T. Devanbu et al., *Proceedings of the 20th International Conference on Software Engineering,* Kyoto, Japan, (found at http://seclab.cs.ucdavis.edu/papers.html), 1998.

"Data Level Inference Detection in Database Systems", R. W. Yip et al., *Proceedings of the 11th IEEE Computer Security Foundations Workshop,* Rockport, Massachusetts, (found at http://seclab.cs.ucdavis.edu/papers.html), 1998.

"The Design and Implementation of a Data Level Database Inference Detection System", Yip et al., *Proceedings of the Twelfth Annual IFIP WG 11.3 Working Conference on Database Security,* Chalkidiki, Greece 14 pages, (found at http://seclab.cs.ucdavis.edu/papers.html), 1998.

"Theft of Information in the Take–Grant Protection Model", Matt Bishop, 35 pages, *Journal of Computer Security* 4(4)(1996), (found at http://seclab.cs.ucdavis.edu/papers.html), Mar. 13, 1997.

"Information Survivability Security, and Fault Tolerance", Matt Bishop, position paper for the Information Survivability Workshop *Journal of Computer Security #6*) 1 page, (found at http://seclab.cs.ucdavis.edu/papers.html), 1997.

"Teaching Computer Security", Matt Bishop, position paper for the *Workshop on Education in Computer Security,* Monerey CA, 3 pages, (found at http://seclab.cs.ucdavis.edu/papers.html), 1997.

"Protecting Routing Infrastructures from Denial of Service Using Cooperative Intrusion Detection", S. Cheung et al., *Proc. New Security Paradigms Workshop,* Cumbria, UK 13 pages, (found at http://seclab.cs.ucdavis.edu/papers.html), 1997.

"An Efficient Message Authentication Scheme for Link State Routing", S. Cheung, *Proc. 13th Annual Computer Security Applications Conference,* San Diego, CA, 9 pages, (found at http://seclab.cs.ucdavis.edu/papers.html), 1997.

"Cryptographic Verification of Test Coverage Claims", P. Devanbu et al., *Proceedings, Fifth ACM/SIGSOFT Conference on Foundations of Software Engineering Zurich,* Switzerland) found at http://seclab.cs.ucdavis.edu/papers.html), 1997.

"Property–Based Testing; A New Approach to Testing for Assurance", Fink et al., *ACM SIGSOFT Software Engineering Notes,* 22(4), (found at http://seclab.cs.ucdavis.edu/papers.html), 1997.

"Checking for Race Conditions in File Accesses", Bishop et al., *Computing Systems* 9(2)., (found at http://seclab.cs.ucdavis.edu/papers.html), 1996.

"An Isolated Network for Research", Bishop et al., *The 19th NISSC,* pp. 1–9, (found at http://seclab.cs.ucdavis.edu/papers.html), 1996.

"Goal–Oriented Auditing and Logging", Bishop et al., submitted to IEEE Transactions on Computing Systems, (found at http://seclab.cs.ucdavis.edu/papers.html), 1996.

"Extending The Take–Grant Protection System", J. Frank et al., The IEEE Oakland Conference on Research in Security and Privacy., (found at http://seclab.cs.ucdavis.edu/papers.html), Dec. 5, 1996.

Network Security Via Reverse Engineering of TCP Code: Vulnerability Analysis and Proposed Solutions, Guha et al., *Proc. of the IEEE Infocom '96,* San Francisco, CA (found at http://seclab.cs.ucdavis.edu/papers.html), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security––Critical Programs In A Distributed System: A Sepcification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering,* vol. 22, No. 10, (found at http://seclab.cs.ucdavis.edu/papers.html), 1996.

"The Exact Security of Digital Signatures–How to Sign with RSA and Rabin", Bellare et al. Earlier version ppears in *Advances in Cryptology–Eurocrypt '96,* LNCS vol. 1070, U. Maurer ed., Springer–Verlag, pp. 399–416), (found at http://seclab.cs.ucdavis.edu/papers.html), 1996.

"How to Protect DES Against Exhaustive Key Search", Kilian et al., Advance in Cryptology—CRYPTO '96., (found at http://seclab.cs.ucdavis.edu/papers.html), 1996.

"GrIDS–A Graph Based Intrusion Detection System For Large Networks", Staniford–Chen et al., *The 19th NISSC.* 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium,* San Jose, CA., (found at http://seclab.cs.ucdavis.edu/papers.html), 1996.

"A Standard Audit Trail Format", Matt Bishop, *Proc. of the 1995 NISSC,* Baltimore, MD., (found at http://seclab.cs.ucdavis.edu/papers.html), 1995.

Abstract entitled Theft of Information in the Take–Grant Protection Model, Matt Bishop, *Journal of Computer Security, vol. 3, No. 4,* (found at http://seclab.cs.ucdavis.edu/papers.html), 1995.

"Improving System Security via Proactive Password Checking", Matt Bishop, *Computers & Security,* vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustion", Chung et al., *Proc. of the 1995 NISSC,* Baltimore, MD, 11 pages, (found at http://seclab.cs.ucdavis.edu/papers.html), 1995.

"Network Security Monitor", L. Todd Heberlein, *Lawrence Livermore National Laboratory project deliverable,* (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11,* (found at http://seclab.cs.ucdavis.edu/papers.html), 1995.

"MCF: A Malicious Code Flter", R.W. Lo et al., *Computers & Security,* (1995) vol. 14, No. 6. (27 pages.), (found at http://seclab.cs.ucdavis.edu/papers.html), 1995.

"Bucket Hashing and its Application to Fast Message Authentication", Phillip Rogaway, *Acvances in Cryptology—CRYPTO '95,* (found at http://seclab.cs.ucdavis.edu/papers.html), 1995.

"Provably Secure Session Key Distribution–The Three Party Case", Bellare et al., *Proc., of the 27th Annual ACM Symposium on Theory of Computing,* Las Vegas, NV, (found at http://seclab.cs.ucdavis.edu/papers.html), 1995.

"XOR MACs: New Methods for Message Authentication Using Finite Pseudorandom Functions", Bellare et al.,*Acvances in Cryptology—CRYPTO '95,* (found at http://seclab.cs.ucdavis.edu/papers.html), Oct. 1995.

"Holding Intruders Accountable on the Internet", Staniford--Chen et al., *Proc. of the 1995 IEEE Symposium on Security and Privacy,* Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference,* 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium.* 10 pages, (found at http://seclab.cs.ucdavis.edu/papers.html), 1994.

"Property–based Testing of Privileged Programs", Fink et al., *Proc. of the 10th Annual Computer Security Applications Conference,* Orlando, FL. 10 pages, (found at http://seclab.cs.ucdavis.edu/papers.html), Dec. 1994.

"Arificial Intelligence and Intrusion Detection: Current and Future Directions", Jeremy Frank, *Proc. of the 17th National Computer Security Conference.* 12 pages, (found at http://seclab.cs.ucdavis.edu/papers.html), 1994.

"Automated Detection of Vulnerabilities in Privileged Programs by Execution Monitoring", Ko et al., *Proc. of the 10th Annual Computer Security Applications Conference,* Orlando FL. (found at http://seclab.cs.ucdavis.edu/papers.html), 1994.

"Common Techniques in Fault–Tolerance and Security", Levitt et al., *Proc. of the Dependable Computing for Critical Applications 4,* San Diego, CA. 4 pages, (found at http://seclab.cs.ucdavis.edu/papers.html), 1994.

"Network Intrustion Detection", Mukherjee et al., *IEEE Network,* May–Jun. 1994, vol. 8, No. 3, pp. 26–41. (found at http://seclab.cs.ucdavis.edu/papers.html).

"A New Suggestion for How to Encrypt with RSA", Bellare et al., *Eurocrypt '94,* 20 pages, (found at http://seclab.cs.ucdavis.edu/papers.html), 1994.

"The Security of Cipher Block Chaining", Bellare et al., *Advances in Cryptology—CRYPTO '94,* Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference or Computer and Communication Security.* Fairfax, VA, Nov. 1993, 11 pages, (found at http://seclab.cs.ucdavis.edu/papers.html).

"Entity Authentication and Key Distribution". Bellare et al., *Advances in Cryptology—CRYPTO '93,* Santa Barbara, CA, Aug 1993, pp. 232–249. (found at http://seclab.cs.ucdavis.edu/papers.html).

"Random Oracles are Practical: A paradigm for Designing Efficient Protocols", Bellare et al., *Proc. of the 1st ACM Conference on Computer and Communication Security,* Fairfax, VA, Nov. 1993, pp. 1545–164 (found at http://seclab.cs.ucdavis.edu/papers.html).

"A Software–Optimized Encryption Algorithm", Rogaway et al., *Proc. of the Fast Software Encryption Cambrige Security Workshop,* Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)–Motivation, Architecture, and An Early Prototype, Snapp et al., *Proc. 14th National Computer Security Conference,* Washington, DC (9 pages.) (found at http://seclab.cs.ucdavis.edu/papers.html), 1991.

"Proactive Password Checking", Matt Bishop, *Proc. of the 7th International Conference on Information Security,* May 1991, pp. 169–181. (found at http://seclab.cs.ucdavis.edu/papers.html).

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled Collaboration Using Roles' by M. Bishop, *Software—Practice and Experience,* vol. 20, No. 5, May 1990. (found at http://seclab.cs.ucdavis.edu/papers.html).

Abstract entitled "An Extendable Password Checker" by M. Bishop, *Proc. UNIX Security II* Portland, OR, 27–28 Aug. 1990, pp. 15–16, (found at http://seclab.cs.ucdavis.edu/papers.html).

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy* Oakland, CA, May 7–9, 1990, pp. 86–94, (found at http://seclab.cs.ucdavis.edu/papers.html).

Abstract entitled "A Network Security Monitor" by L.T. Heberlein, G.V. Dias, K.N. Levitt, B. Mukherjee, and others *Proc. of the 1990 IEE Symposium on Research in Security and Privacy,* Oakland, CA, May 7–9, 1990, pp. 296–304, (found at http://seclab.cs.ucdavis.edu/papers.html).

Abstract entitled "Static Analysis Virus Detection Tools for UNIX Systems" by P. Kerchen, et al., *Proc. 13th National Computer Security Conference,* Washington, DC, Oct. 1–4, 1990, pp. 350–365, (found at http://seclab.cs.ucdavis.edu/papers.html).

Abstract entitled "Security with Low Communication Overhead" by D. Beaver, et al., *Proc. Advances in Cryptology--CRYPTO '90,* Santa Barbara, CA, Aug. 11–15, 1990, pp. 62–76, (found at http://seclab.cs.ucdavis.edu/papers.html).

Abstract entitled "The Round Complexity of Secure Protocols" by D. Beaver, et al., *Proc. of the 22nd Annual ACM Symposium on Theory of Computing,* Baltimore, MD, May 14–16, 1990, pp. 503–513. (found at http://seclab.cs.ucdavis.edu/papers.html).

Abstract entitled "PACLs: An Access Control List Approach to Anti–Viral Security" by D.R. Wichers, et al., *Proc. 13th National Computer Security Conference,* Washington, DC, Oct. 1–4, 1990, pp. 340–349. (found at http://seclab.cs.ucdavis.edu/papers.html).

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy,* Oakland CA May 20–22, 1991, pp. 122–135. (found at http://seclab.cs.ucdavis.edu/papers.html).

Abstract entitled "An Authentication Mechanism for USENET" by M. Bishop, *Proc. of the Winter 1991 USENIX Conference.* Jan. 21–25, 1991, pp. 281–287, (found at http://seclab.cs.ucdavis.edu/papers.html).

Abstract entitled "Password Management" by M. Bishop, *COMPCON Spring '91. Digest of Papers.* San Francisco, CA, Feb. 25–Mar. 1, 1991, pp. 167–169. (found at http://seclab.cs.ucdavis.edu/papers.html).

Abstract entitled "Teaching Computer Security" by M. Bishop.

Abstract enttled "Recent Changes to Privacy Enhanced Electronic Mail" by M. Bishop, *Journal of Internetworking: Research and Experience.* vol. 4, No. 1, Mar. 1993, pp. 47–59. (found at http://seclab.cs.ucdavis.edu/papers.html).

Abstract entitled "A Modified Random Perutrbation Method for Database Security" by P. Tendick, N. Matloff, *ACM Transactions on Database Systems,* Mar. 1994, vol. 19, No. 1, pp. 47–63, (found at http://seclab.cs.ucdavis.edu/papers.html).

Short presentation entitled "Intrusion Detection for network Infrastructures" by S. Cheung, K.N. Levitt, C. Ko. *The 1995 IEEE symposium on Security and Privacy,* Oakland CA, May 1995.

Master Thesis entitled "Paradigms for the Reduction of Audit Trails" by B. Wetmore, pp. i–6, Unable to obtain entire thesis—portion downloaded from http://seclab.cs.ucdavis.edu/papers.html), 1993.

"Open System Security—an Architectural Framework" by Arto T. Karila, (found at http://www/cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2, No date.

NetRanger 1.3 User's Guide, Copyright © 1997 by Wheel-Group Corporation, NetRanger product first available summer of 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

* cited by examiner

DOMAIN MAPPING METHOD AND SYSTEM

CROSS-REFERENCE TO RELATED APPLICATIONS

This application is related to U.S. patent application Ser. No. 09/222,414 issued as U.S. patent Ser. No. 6,301,668 on Oct. 9, 2001, entitled "Method and System for Adaptive Network Security Using Network Vulnerability Assessment", filed Dec. 29, 1998, and presently pending U.S. patent application Ser. No. 09/223,071 entitled "Method and System for Adaptive Network Security Using Intelligent Packet Analysis", filed Dec. 29, 1998.

TECHNICAL FIELD OF THE INVENTION

The present invention relates in general to computer networks and, more particularly, to a method and system for domain mapping of a network.

BACKGROUND OF THE INVENTION

Network security products such as intrusion detection systems (ID systems) and firewalls can use a passive filtering technique to detect policy violations and patterns of misuse upon networks to which the Security products are coupled. The passive filtering technique usually comprises monitoring traffic upon the network for packets of data. A signature analysis or pattern matching algorithm is used upon the packets, wherein the packets are compared to "attack signatures", or signatures of known policy violations or patterns of misuse.

In order to properly detect policy violations and patterns of misuse, security products often must place the packets of data in contexts relevant to such connection criteria as space, time, and event. Space is usually defined in terms of a source-destination connection at the port level. Time is defined as the amount of time to continue associating packets for the type of connection defined by the source-destination connection. Event is defined as a type of connection, which in turn defines the types of policy and misuse signatures that can occur with each packet. As the size of a network expands, there are greater numbers of connections which leads to greater numbers of lookups and comparisons that must be performed by the Security product.

Two problems are associated with conventional security products. First, conventional security products have insufficient information to. self-configure for reliable detection of policy violations and patterns of misuse. For example, conventional security products have no mechanism to reliably ascertain network information of the network to which the security product is coupled. This leads to such disadvantages such as being unable to accurately predict the effect of a particular packet upon a destination device. Furthermore, a conventional security product has no mechanism to ascertain the network topology and thus cannot predict if a certain packet will reach its intended destination. Such a lack of network information compromises the security product's ability to detect such attacks such as insertion attacks, evasion attacks and denial of service attacks. Some of these problems with conventional security products are documented by Ptacek and Newsham, Insertion, Evasion, and Denial of Service: Eluding Network Intrusion Detection, Secure Networks Incorporated, January 1998.

A second problem associated with conventional security products is the result of scarcity of processor and memory resources. Conventional security products may begin to drop packets and shut down certain tasks in an unpredictable fashion once the system depletes its memory or processor resources. As the size of a network grows, such a failure becomes more likely, as the greater the number of connections onto the network requires a greater number of lookups and comparisons performed by the Security product. Additionally, an increase in number and complexity of the types of misuse the security product is required to detect can further degrade performance. An increase in traffic flow further drains a security product's resources. For example, conventional ID systems cannot operate effectively at high network bandwidth utilization.

Some conventional systems have attempted to achieve performance gains by decreasing the number of misuse signatures the security product monitors. Fewer signatures translate into fewer memory comparisons for each packet that flows through the security product. However, such a solution makes a network more vulnerable to attacks.

Other conventional systems rely on the user to enumerate the network information, such as the types of operating systems and applications running on the protected network. These systems then disable certain misuse signatures accordingly.

Such a conventional solution, however, introduces its own problems. For example, if the user provides an inaccurate assessment of the network, then incorrect signatures may be disabled, meaning that undetected policy violations and network attacks are possible. Additionally, networks are rarely stable environments and the addition or deletion of devices or services can make the original network information supplied by the user inaccurate.

A further disadvantage of such conventional security products is that they are not designed to function in an environment wherein the traffic exceeds their memory or processor capacity. Such conventional systems, when confronted with traffic that exceeds their capacity, may start dropping packets and degrade performance in an unpredictable fashion. This can lead to an unknown security posture or profile, which can leave a network more vulnerable to undetected attacks.

SUMMARY OF THE INVENTION

Therefore, a need has arisen for a method and system that provides a centralized domain mapping of network device information with minimized acquisition overhead and rapid availability to queries from network devices, including network security devices.

A further need exists for a method and system that provides a centralized domain mapping of network device information available for querying by network devices regardless of the capability of the querying network devices to independently acquire network device information.

In accordance with the present invention, a domain mapping method and system is disclosed that provides significant advantages over conventional methods and systems for providing network device information for use by network devices, such as network security devices. A domain mapping device interfaces with plural network devices through the network to receive and store network information from one or more of the network devices, and to provide the network information to one or more network devices upon receiving a query.

More specifically, the domain mapping device includes an acquisition engine for acquiring the network information, a hypercube storage for storing the network information, and a query engine for responding to queries from network devices for the network information. The acquisition engine can acquire network information through active capture, passive capture, polling, or, in cooperation with a network device, through pushing of the network information from the network device. The hypercube storage provides a dimensional, highly indexed data store with a compact footprint and superior update and query performance characteristics. The query engine supports network device queries of network information, including device type, services, operating system and vulnerability data.

One technical advantage of the present invention is that it provides a centralized source of network information that reduces data acquisition overhead and the time needed to obtain network information from network devices. The reduced overhead and time associated with obtaining network information, in turn, supports a more scalable adaptive network security solution.

Another technical advantage of the present invention is that the centralized storage of network information supports access by network devices to all types of network information independent of the network devices' capability to acquire such data. For instance, network devices that include only passive data sampling capabilities could query the domain mapping device to obtain data available only through active scans. Further, network devices that lack data acquisition capabilities can obtain otherwise unavailable network information from the domain mapping device.

It is a further technical advantage of the present invention that it allows devices coupled to the network auto-configure based upon the network information.

It is an additional technical advantage of the present invention that it allows devices to adapt configurations according to a changing network environment, as reflected in changing network information.

It is another technical advantage that the present invention reduces network overhead associated with network information acquisition because it represents a centralized depository of the network information.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
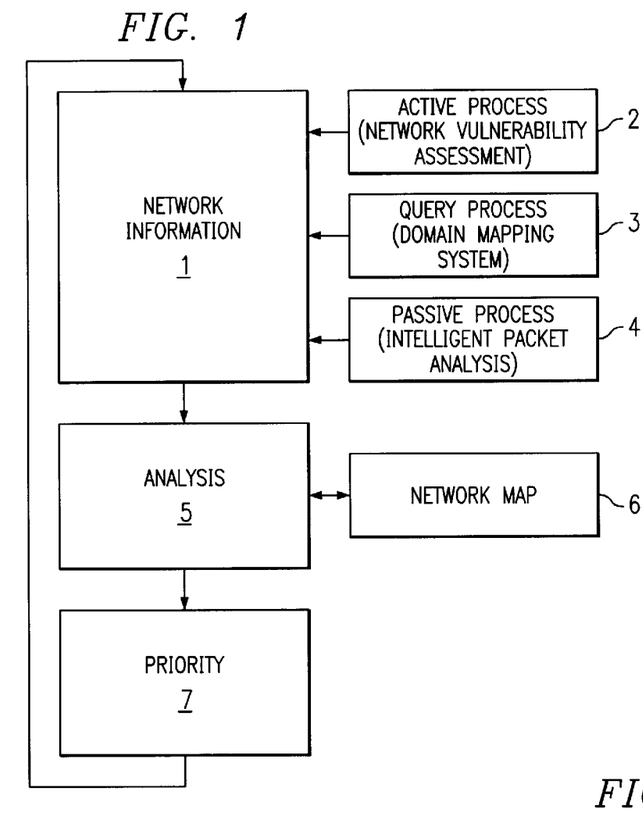
FIG. 1 is a flow diagram of various embodiments of a method of operation of a system for adaptive network security.

FIG. 1 is a flow diagram of various embodiments of a method of operation of a system for adaptive network security. An ID System is one such security system that could benefit from the adaptive network security system of the present invention.

In the method of FIG. 1, network information is acquired at step 1. Network information can comprise, for example, the devices, operating systems, and services available on a network.

In the embodiments of FIG. 1, such network information can be gathered by an active process 2, a passive process 4, or a query process 3. Active process 2 can include port scans, pinging, and other active methods performed on devices coupled to the network, as well as monitoring responses (such as banners) sent in response to such active methods. One such active process is described in the related U.S. patent application Ser. No. 09/222,414 entitled "Method and System for Adaptive Network Security Using Network Vulnerability Assessment", filed Dec. 29, 1998 now U.S. Pat. No. 6,301,668. A second alternative to acquire network information is passive process 4. Passive process 4 allows a security device using the present invention to acquire network information without placing additional traffic on the network. One such passive process is an intelligent packet analysis. A method and system for adaptive network security using intelligent packet analysis is described more fully below in the related U.S. patent application Ser. No. 09/223,071 entitled "Method and System for Adaptive Network Security Using Intelligent Packet Analysis", filed Dec. 29, 1998.

The third process for obtaining network information, query process 3, can comprise sending a query to a domain mapping service, wherein the domain mapping service maintains a compilation of network information. Such a domain mapping service is the subject of the present invention. Such a domain mapping service can respond to such a request by sending the network information to a source of the request. Such a query system is referenced in the patents listed above, and the domain mapping system is explained more fully below.

Once network information is acquired, an analysis at step 5 is performed. For example, a network map 6 can be created to compile the network information. At step 7, a priority task is performed using the analysis of the network information at step 5. For example, an ID system using such a method can configure itself to perform high priority tasks based upon potential vulnerabilities of the network, as identified by the analysis at step 5.

The performance of steps 1, 5, and 7 can occur in one or more devices coupled to a network. For example, processes performing such tasks could be distributed among several devices in order to preserve processing resources. Alternatively, the processes performing such tasks could be integrated into a single device, such as an ID system, router, or firewall.

Security devices protect network devices associated with a predetermined domain of the network from unauthorized or malicious use. In order to provide the most broad possible protection, security devices need access to information about the network devices associated with the network domain being protected. However, the topology of a typical network domain changes rapidly as network devices are interfaced or brought online to the network domain. The domain mapping method and system of the present invention provides reliable information about network devices associated with the domain so that security devices can provide the broadest possible protection against unauthorized or malicious use of the network devices. Further, the domain mapping method and system supports storage of domain mapping information to reduce overhead associated with acquiring and using the domain mapping information. The stored domain mapping information is available for use by network security devices.

Figure 2:
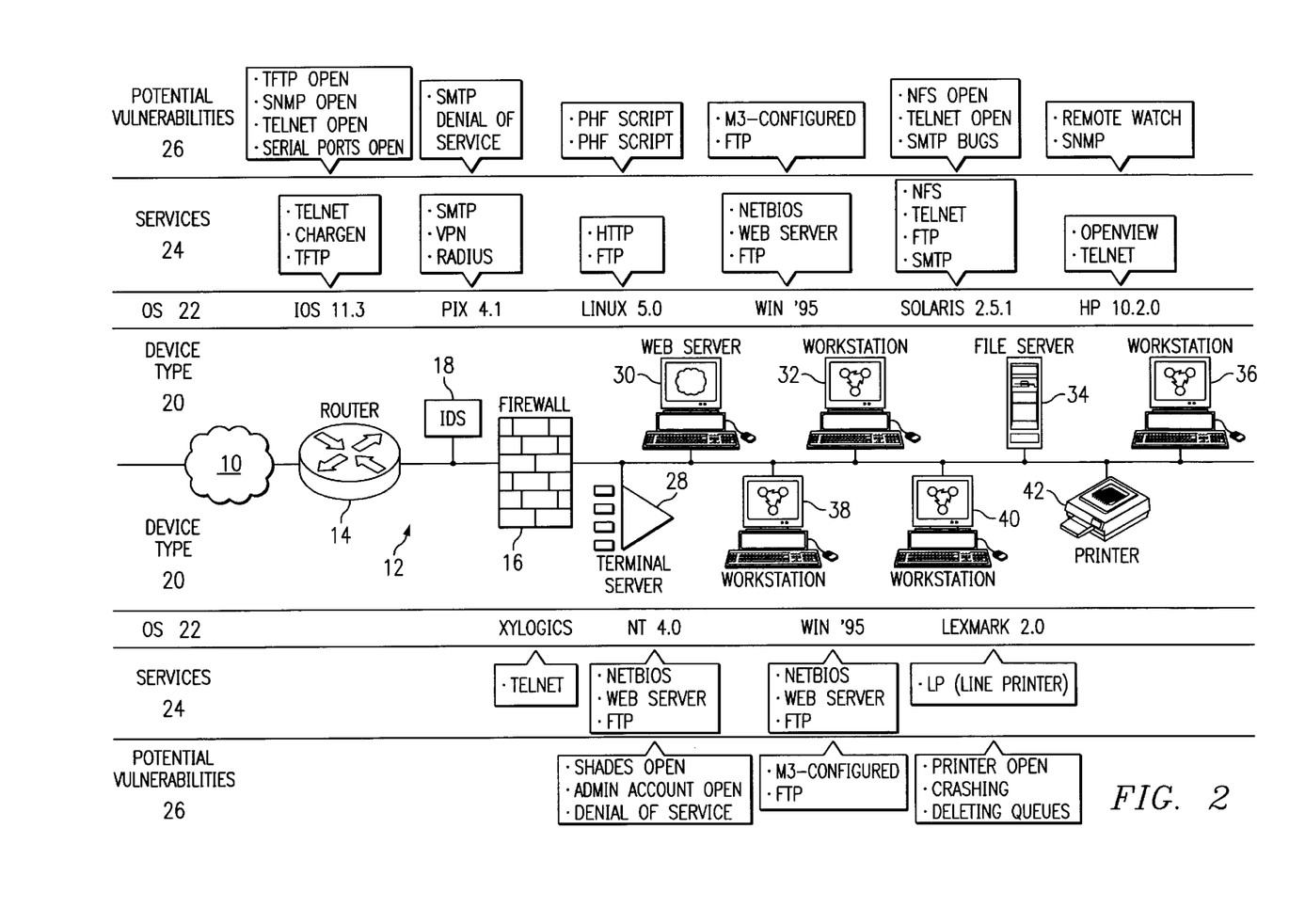
FIG. 2 is a block diagram depicting a network domain with network devices and their associated operating systems, services and potential vulnerabilities.

Referring now to FIG. 2, a block diagram depicts a typical network topology. Internet 10 interfaces with network domain 12 having plural network devices. A router 14 accepts network traffic from Internet 10 and provides the network traffic to a firewall 16. Firewall 16 is a network security device that monitors network traffic and restricts the communication of certain types of network traffic. An intrusion detection system 18 also monitors network traffic to detect attack signatures associated with unauthorized or malicious use of network devices. Intrusion detection system 18 is shown as placed between firewall 16 and router 14. However, those skilled in the art will recognize intrusion detection system 18 can alternatively be positioned behind firewall 16 or between router 14 and Internet 10, or incorporated within another device such as firewall 16 or workstation 32.

FIG. 2 includes device-type rows 20, which depict exemplary device types associated with network domain 12. Operating system rows 22, services rows 24 and potential vulnerabilities rows 26 depict the operating system, services and potential vulnerabilities associated with the exemplary device types in device types rows 20. For instance, router 14 uses operating system IOS 11.3 and provides telnet, charge-in and TFTP services. Potential vulnerabilities associated with router 14 include TFTP open, SNMP open, telnet open and serial ports open vulnerabilities. Other devices interfaced with network domain 12 include a webserver 30, work stations 32, 36, 38 and 40, a file server 34 and a printer 42. Each of these network devices can use the associated operating system of operating system rows 22 and provide the services of services rows 24. Potential vulnerabilities rows 26 identify potential vulnerabilities associated with the network devices.

Figure 3:
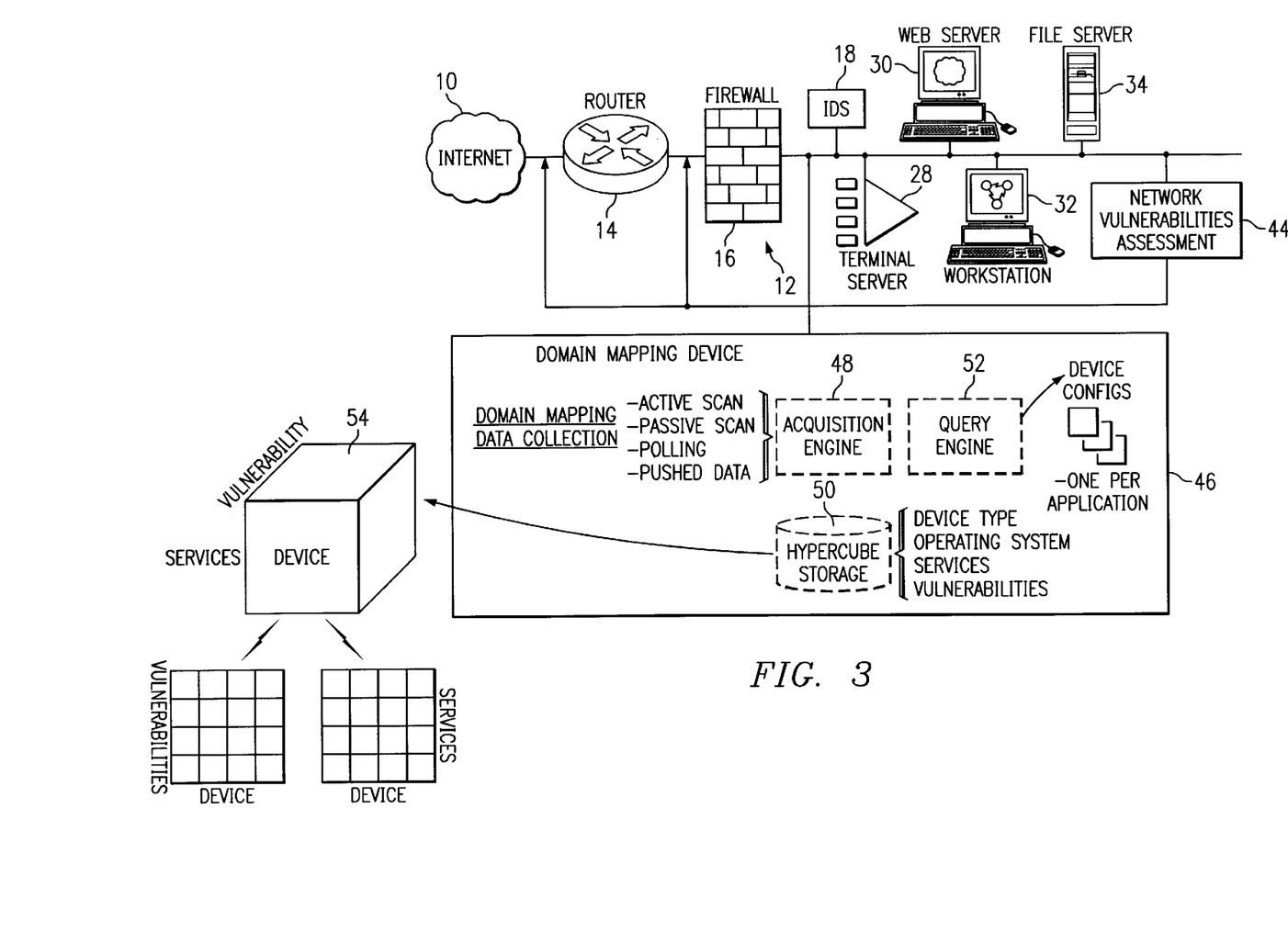
FIG. 3 is a block diagram depicting a network domain that includes a domain mapping device.

Referring now to FIG. 3, a block diagram depicts a domain mapping device 46 interfaced with network 12. Domain mapping device 46 resides behind firewall 16. Domain mapping device 46 includes an acquisition engine 48, hypercube storage 50 and a query engine 52. Domain mapping device 46 supports acquisition of network information for the network devices of network 12, storage of the network information and a query interface to allow network devices to query stored network information from the domain mapping device 46. Thus, domain mapping device 46 acts as a centralized data repository of network information, such as the device type, operating system, services, and network vulnerabilities of network devices associated with network domain 12.

Acquisition engine 48 of domain mapping device 46 enables the acquisition of network information through a number of different methods. One method of acquiring network information is active capture of the network information from network devices. To perform active capture of network information, acquisition engine 48 sends messages to one of more network devices to actively query for network information, including identification of each device type, and its operating system, services and potential vulnerabilities. Acquisition engine 48 can also send messages to a network vulnerabilities assessment device 44 that performs assessments of network devices to determine potential vulnerabilities. The method of acquiring network information by active capture and the operation of network vulnerabilities assessment device 44 is described in greater detail in U.S. patent application Ser. No. 09/107,964, now U.S. Pat. No. 6,324,656, entitled "System and Method for Rules-Driven Multi-Phase Network Vulnerability Assessment," and U.S. patent application Ser. No. 09/222,414, now U.S. Pat. No. 6,301,668, entitled "Method and System for Adaptive Network Security Using Network Vulnerability Assessment" which are incorporated herein by reference. As shown in FIG. 2, network vulnerabilities assessment device 44 can be placed in various configurations, such as behind firewall 16, between firewall 16 and router 14, and in front of router 14.

Another method for acquiring network information is passive capture. Acquisition engine 48 performs passive capture by monitoring network traffic and analyzing the network traffic to determine the network information of network devices. For instance, by monitoring data packets sent to file server 34, acquisition engine 48 can determine the operating system and services provided, such as a Solaris operating system that performs FTP transfers. Once the operating system and services are known, acquisition engine 48 can determine known vulnerabilities associated with the operating system and services. Passive capture of network information reduces network overhead. U.S. patent application Ser. No. 09/223,071, entitled "Method and System for Adaptive Network Security Using Intelligent Packet Analysis," discloses passive capture techniques in greater detail, and is incorporated herein by reference.

Two additional techniques for acquiring network information are polling of network devices and pushing network information from network devices to acquisition engine 48. Polling is performed by sending a series of queries (such as SNMP) to the network devices to determine their response. Pushed data is enabled by using push technology to send data from the network devices to acquisition engine 48 for analysis. The polling and push data acquisition techniques can take advantage of capabilities for certain network devices to collect their own data.

Once network information is acquired, it is stored in hypercube storage 50 of domain mapping device 46. Network information is inherently dimensional, lending itself to the hypercube storage techniques described in U.S. patent application Ser. No. 09/107,790, entitled "System and Method for Real-Time Insertion of Data Into a Multi-Dimensional Database for Network Intrusion Detection and Vulnerability Assessment," which is incorporated herein by reference. Although other embodiments of domain mapping device 46 can use conventional data storage techniques, the highly indexed data store of hypercube storage provides a compact footprint with superior query and update performance characteristics that enhance overall system performance. As depicted by cube 54 the three dimensional hypercube storage can associate device-type information, service information, and vulnerability information with each dimension of the hypercube.

Query engine 52 interfaces the network information with network devices through queries made by the network devices. For instance, intrusion detection system 18 can query engine 52 to obtain network information, such as identification of a device operating system, services and vulnerabilities, for a network device, such as file server 34, that is protected by intrusion detection system 18. The network information allows intrusion detection system 18 to provide maximum protection of file server 34 or other network devices based upon the most current possible data available through domain mapping device 46. Query engine 52 provides a device configuration for each application running on the network device. Query engine 52 also supports classic grammar for data selection, group by, and sort criteria. Thus, intrusion detection system 18 can obtain a list of vulnerabilities for a specific network domain that is grouped by operating system and sorted into descending order of incidence.

Domain mapping device 46 provides a centralized source of network information that greatly reduces data acquisition overhead on the network as well as the time it takes to obtain network information. The centralized data storage allows access to all types of data for network devices regardless of how the data was acquired. For instance, network devices that only have passive sampling data capabilities can query domain mapping device 46 to obtain data only available via active scans. Further, devices that have no data acquisition capabilities can obtain all of their information from domain mapping device 46.

Figure 4:
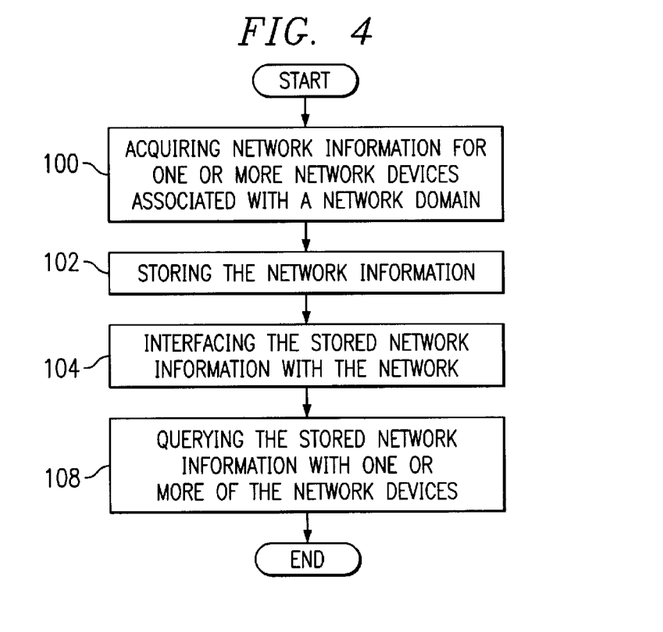
FIG. 4 is a flowchart illustrating a method for mapping a network domain.

FIG. 4 is a flowchart illustrating a method for mapping a network domain. The method begins at step 100 which involves acquiring network information for one or more network devices associated with the network domain. Next, at step 102, the method involves storing the network information. Then, at step 104, interfacing the stored network information with the network is performed. Proceeding to step 106, querying the stored network information with one or more of the network devices is performed.

Although the present invention has been described in detail, it should be understood that various changes, substitutions and alterations can be made thereto without departing from the spirit and scope of the invention as defined by the appended claims.

What is claimed is:

1. A system for mapping a network domain, the system comprising:
   plural network devices interfaced with the network, each network device having network information; and
   a domain mapping device interfaced with the network, the domain mapping device operable to:
      receive and store the network information from one or more network devices,
      provide the network information to an intrusion detection system upon receiving a query,
      analyze the stored network information,
      generate a network map based on the analysis and the stored network information,
      determine a potential vulnerability based on the analysis, and
      configure the intrusion detection system based on the network map and the potential vulnerability.

2. The system of claim 1 wherein the domain mapping device further comprises an acquisition engine operable to acquire network information.

3. The system of claim 2 wherein the acquisition engine acquires network information with active capture of the network information from one or more network devices.

4. The system of claim 2 wherein the acquisition engine acquires network information with passive capture of the network information from one or more network devices.

5. The system of claim 2 wherein the acquisition engine polls the one or more network devices to acquire network information from the one or more network devices.

6. The system of claim 2 wherein the acquisition engine receives network information pushed from one or more network devices.

7. The system of claim 1 wherein the network information comprises vulnerabilities of the one or more network devices.

8. The system of claim 7 wherein the network information further comprises device type, services and operating system information of the one or more network devices.

9. The system of claim 1 wherein the domain mapping device further comprises hypercube storage operable to store network information.

10. The system of claim 1 wherein the domain mapping device further comprises a query engine operable to respond to queries from one or more network devices for network information.

11. A method for mapping a network domain comprising the steps of:
   acquiring network information for one or more network devices associated with the network domain;
   storing the network information;
   interfacing the stored network information with the network;
   querying the stored network information with an intrusion detection system;
   analyzing the stored network information;
   generating a network map based on the analysis and the stored network information;
   determining a potential vulnerability based on the analysis; and
   configuring the intrusion detection system based on the network map and the potential vulnerability.

12. The method of claim 11 wherein the acquiring step comprises active capture of network information from one or more of the network devices.

13. The method of claim 11 wherein the acquiring step comprises passive capture of network information from one or more of the network devices.

14. The method of claim 11 wherein the acquiring step comprises polling network devices for network information.

15. The method of claim 11 wherein the acquiring step comprises pushing network information from one or more network devices for storage on a centralized repository.

16. The method of claim 11 wherein the network information comprises identification of one or more services associated with one or more of the network devices.

17. The method of claim 11 wherein the network information comprises identification of one or more operating systems associated with one or more of the network devices.

18. The method of claim 11 wherein the network information comprises identification of the device type of one or more network devices.

19. The method of claim 11 wherein the network information comprises vulnerabilities of one or more of the network devices.

20. The method according to claim 11 wherein the storing step comprises hypercube storage of the network information.

* * * * *